May 28, 1929. W. H. STARK ET AL 1,715,175
KENNEL CONSTRUCTION
Filed April 13, 1925
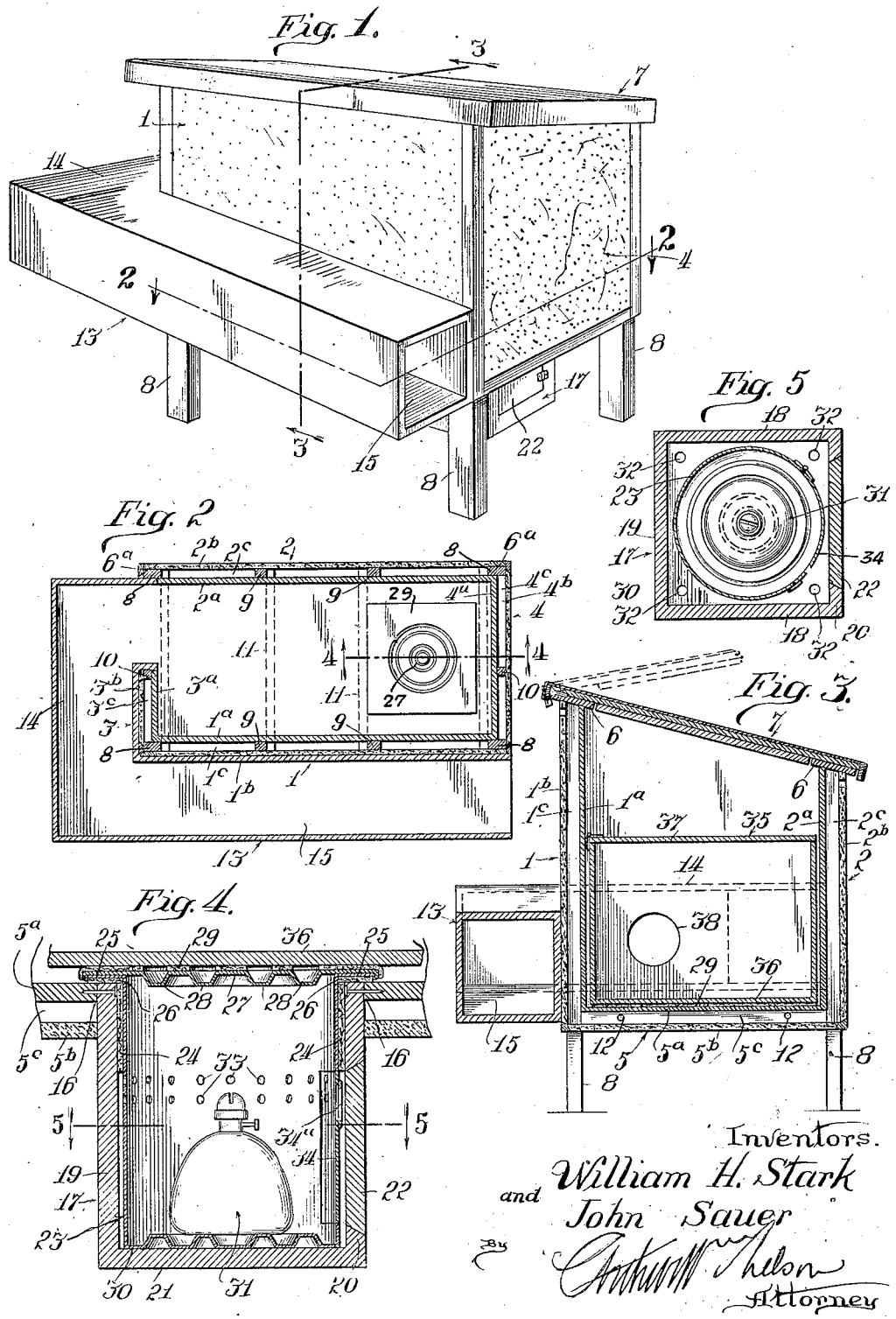

Patented May 28, 1929.

1,715,175

UNITED STATES PATENT OFFICE.

WILLIAM H. STARK, OF CONOVER, AND JOHN SAUER, OF EAGLE RIVER, WISCONSIN.

KENNEL CONSTRUCTION.

Application filed April 13, 1925. Serial No. 22,542.

This invention relates to improvements in kennel constructions and consists in the matters hereinafter described and more particularly pointed out in the appended claims.

The comparatively new industry of raising wild animals in captivity for their fur and particularly the raising of the different breeds of fox for this purpose, has necessitated the provision of kennels not only for their shelter but also for the rearing of their young. Being raised in captivity and away from their natural habitat they have no material for the building of their nests, which, of course, must be provided by man to the best of his ability. The fox in its wild state has certain preferences in locating its nesting place, which must be fairly warm and dry and not only protected from the elements but also one wherein only a subdued light, if any, may enter.

Kennels have been used in the so called "fox farming or raising" industry but these kennels by reason of their construction and location out in the open have proven indeed unsatisfactory in the winter to provide the shelter necessary not only for the older animals but especially the young and by reason thereof many of the foxes have died of the extreme cold. Fur bearing foxes are quite expensive so that the loss of one of or a mated pair is indeed a loss for the owner.

The primary object of the present invention is to provide a kennel construction more particularly adapted to the raising of foxes, and one of which includes as near as possible all the requirements of the natural nest of a fox as above set forth.

A further object of the invention is to provide a kennel, which is ventilated and is sanitary and which may be warmed to that degree required for the breeding and raising of the young.

A further object of the invention is to provide a heating chamber, normally arranged outside of and below the nesting space of the kennel and one wherein the heating element in said chamber is not only visible but may be easily gotten at for the purpose of inspection, replenishing and the like, without disturbing the interior of the kennel or the animals within the same.

Still another object of the invention is to provide a heating chamber and contained element which may be readily installed in kennels now in use or in new kennels during the manufacture thereof.

These objects of the invention as well as others, together with the many advantages thereof will more fully appear as we proceed with our specification.

In the drawings:

Fig. 1 is a view in perspective of a kennel construction embodying one form of our invention.

Fig. 2 is a horizontal plan sectional view as taken on the lines 2—2 of Fig. 1.

Fig. 3 is a vertical sectional view through the kennel as taken on the line 3—3 of Fig. 1.

Fig. 4 is an enlarged detail vertical sectional view as taken on the line 4—4 of Fig. 2.

Fig. 5 is a detail horizontal sectional view as taken on the line 5—5 of Fig. 4.

In describing that embodiment of the invention illustrated herein, the same will be referred to as for use in the fox raising industry, but this is to be taken for the purpose of illustration only and not for the purpose of limitation, as kennels embodying our invention may also be used in other animal industries where its peculiar characteristics make it advantageous to do so.

In general, the improved kennel comprises an open top box-like structure mounted on legs so that said structure does not rest directly upon the ground but is spaced a suitable distance above the same. Said box-like structure has inner and outer side, end and bottom walls with communicating air spaces between them and the open top is normally closed by an inclined hinged roof or cover which may be readily lifted to give access to the interior thereof. A chute opens at one end into the kennel, entrance for the animals into the chute being provided at the other end of the kennel. In said last mentioned end of the kennel is located a removable nesting box and suspended from the bottom wall or floor beneath said nesting box is a heating element by means of which the nesting box is warmed by heat transmission through its floor or bottom wall. In actual use the kennel stands about 14 inches off the ground and we find that one about 3′, 9″ long by about 2′, 6″ wide and 2′, 6″ high is the most practical for use in the fox raising industry but these dimensions may be changed without departing from the spirit of the invention.

Referring now in detail to that embodiment of the invention illustrated in the accompanying drawings, the kennel includes an open top, box-like structure having upright front and rear hollow walls 1 and 2, respectively, hollow end walls 3 and 4 and a hollow bottom wall 5. The front wall is higher than the rear wall and the top edges of the end walls incline from front to rear, all of said walls being closed at their top by cap strips 6 (see Fig. 3). A roof or cover member 7 is pivoted to the cap strip 6 associated with the front wall so that said roof or cover may be lifted up from the rear to give access to the interior of the kennel. Said roof member is of such a plan area as to overhang said front, rear and end walls and when closed slants as shown so as to effectively shed the rain. The front and rear walls comprise inner and outer wall sections $1^a$, $1^b$ and $2^a$—$2^b$, respectively spaced apart to provide an air space or chamber $1^c$ and $2^c$, respectively. The end walls 3 and 4 also comprise inner and outer wall sections $3^a$—$3^b$ and $4^a$—$4^b$, respectively, also spaced apart to provide an air space or chamber $3^c$ and $4^c$ respectively between said end wall sections. The bottom wall 5 likewise comprises inner and outer wall sections $5^a$—$5^b$ spaced apart to provide an air space or chamber $5^c$. All of the inner wall sections are preferably made of wood while the outer wall sections are preferably but not necessarily of a stucco on lath construction, there being suitable ground or furring strips $6^a$ at the four outside corners of the box-like structure. The sheathing $5^a$ of the bottom wall provides the floor proper for the kennel.

The kennel proper is supported a suitable distance above the ground by legs 8 arranged one at each of the four corners of the structure. The said legs extend up through the air spaces of the various walls to terminate at the cap strip 6 and form the main supporting members of said structures. In the air spaces $1^c$ and $2^c$ of the front and rear walls are provided upright studdings 9—9 and in the air spaces of the end walls are similar studdings 10—10, which studdings extend from the top to the bottom of said air spaces.

In the air space $5^c$ of the bottom wall are transverse stringers 11—11, the intermediate ones of which are nailed at their ends to the bottom ends of the studdings 9—9 and the endmost ones of which are nailed to that portion of the corner legs 8 extending up through said air space. The studdings and stringers divide the various air spaces into sections or parts which have communication with each other by means of openings 12 (see Fig. 3) provided in said stringers. In the outer wall section near the cap strips 6 are formed ventilation openings for said air spaces. It is apparent from the foregoing that a strong and rigid structure having air space insulated walls is provided.

Entrance for the animals is provided by an enclosed chute 13 which includes a part 14 that extends parallel with the end wall 3 and opens into the same as best shown in Fig. 2 and a second part 15 which extends parallel with the front wall 1 and has an entrance and exit opening with the plane of the other end wall 4 as best shown in Fig. 1. Preferably the part 15 of the chute is inclined slightly downwardly toward its entrance and exit end or opening. Such a construction is advantageous because it prevents drafts of cold air from entering the kennel and at the same time keeps the interior of the same substantially dark without the necessity of employing doors of any kind.

In the bottom wall 5 of the kennel and near the end wall 4 is provided a rectangular opening 16 in which is arranged a heater casing 17 as best shown in Figs. 1 and 5. This casing is preferably in the form of an open top wooden box, with its major portion arranged below the floor so that access may be had into the interior thereof without in any manner opening up the kennel and disturbing the animal or animals that may happen to be within the same. Said casing is rectangular in plan and has front and rear walls 18—18 and end walls 19—20 and a bottom wall 21. In the end wall 20 is provided a door opening normally closed by a door 22 easily accessible from the adjacent end of the kennel. This casing is secured in place by nailing the same to the sheathing $5^a$ providing the floor proper of the kennel as best shown in Fig. 4.

Within the said box-like wooden casing is an upright tubular sub-casing 23 of a diameter a trifle less than that of the main casing so that said sub-casing may be easily withdrawn and replaced through the open top of the main casing. The top end part of the sub-casing is insulated from the side walls of the main casing by an asbestos or like sheet 24 which is wrapped around said top end part as best shown in Fig. 4. The top end of said sub-casing has a radial flange 25 which is rectangular in plan and is of such a diameter as to overhang and engage upon the top edges of the side and end walls of the main casing 17, a sheet of insulating material 26 being interposed between said flanges and edges of said end and side walls.

The open top of the sub-casing 23 is closed by a sheet metal wall 27 which may be either permanently or detachably secured at its edges to the edges of the flange 25. In said top wall 27 are provided a plurality of annular, depending channels 28 and upon said top wall and covering all of the same except said channels is a sheet of insulation 29, as for instance asbestos. The sub-casing 23 has a bottom wall 30 which as shown herein is annularly corrugated to increase its stiffness. The height of the sub-casing is so proportioned that when its top flange rests upon the top edges of the main casing side and end walls, the bottom wall of said sub-casing will rest upon the bottom wall of the main casing.

Within the sub-casing is provided a heating element 31 in the form of an open flame lamp with a glass oil reservoir. Air to support combustion is admitted into the same by openings 32 at the corners of the bottom wall 21 of the main casing and by openings 33 in the sub-casing wall below the bottom edge of the insulation 24. In one wall portion of the sub-casing in line with the door 22 of the main casing is provided a hinged door 34 carrying a transparent window 34ª. By means of the doors as described, the condition of the heater lamp may be easily ascertained and said doors are made large enough so that the heater lamp may be removed therethrough for purpose of cleaning and replenishing its fuel reservoir.

Within the kennel above the heater casing is a nesting box 35, the bottom wall 36 of which rests directly upon the asbestos mat 29 upon the top wall of the sub casing. Said nesting box has a hinged top cover 37 and in that side wall adjacent the side wall 3 of the kennel is provided an opening 38 by means of which the animals enter and leave the nesting box. This opening is spaced a suitable distance above the bottom wall of the nesting box so that the new born pups cannot get through the same until they reach the proper age.

When the heater lamp is burning, heat is transmitted through the channel portions of the sub-casing and warms up the bottom wall of the nesting box to that degree required for the animals, it not being the intention to heat the box to a "summer" heat.

In making up the kennel, the interior sheathing is preferably treated with any suitable material acting as an insecticide and a deodorant so that the kennel will be sanitary. No drafts can enter the interior of the kennel which is dry and warm so that the animals occupying the same are amply sheltered from the weather. The kennel may be easily moved about to change its location. The double wall construction increases the comfort of the animals and the heating element may be easily observed and removed when necessary without in any manner disturbing said animals.

While in describing our invention, we have referred to certain details of mechanical construction and arrangement of parts, the same is for the purpose of illustration only so that, therefore, we do not wish to be limited thereto except as may be pointed out in the appended claims.

We claim as our invention:

1. A kennel construction embodying a floor having an opening therein, a heater casing arranged in said opening and including a wall closing said opening, a heater element arranged in said casing, a nesting box within the kennel and resting on said casing wall and insulating means interposed between the bottom of the nesting box and a part of said casing wall.

2. A kennel construction embodying a floor having an opening therein, a heater casing fixed with its top end within said opening so that its bottom end is arranged without and is accessible from outside the kennel, said casing including a metallic top wall, a heater element arranged in said casing, said wall being so formed as to permit passage therethrough of only a part of the heat from said heater element and a nesting box adapted to removably seat upon said wall.

3. A kennel construction embodying a floor having an opening therein, a heater casing fixed with its top end within said opening so that its bottom end is arranged without and is accessible from outside the kennel, said casing including a metallic top wall, a heater element arranged in said casing, said wall having a plurality of inwardly extending channels therein, insulating material arranged on said wall and arranged to expose said channels so the heat may pass therethrough and a nesting box adapted to seat upon said insulating material.

4. A kennel construction embodying a floor having an opening therein, a heater casing fixed with its top end within said opening so that its bottom end is arranged without and is accessible from outside the kennel, said casing including a metallic top wall, a heater element arranged in said casing, said wall having a plurality of annularly arranged, inwardly extending integral channels therein, a heat insulating pad covering all of said wall except above said channels and a nesting box adapted to seat upon said insulating pad.

In testimony whereof, I have hereunto set my hand this 2 day of Apr., 1925.

WILLIAM H. STARK.

In testimony whereof, I have hereunto set my hand this 30th day of March, 1925.

JOHN SAUER.